United States Patent [19]

Finch et al.

[11] 4,024,216
[45] May 17, 1977

[54] CARBONATE LEACH URANIUM ORE PROCESSING WITH SODIUM POLYACRYLATE FLOCCULANT

[75] Inventors: Robert E. Finch, Naperville, Ill.; Robert H. Scala, Grand Junction, Colo.

[73] Assignee: Nalco Chemical Company, Oak Brook, Ill.

[22] Filed: July 2, 1975

[21] Appl. No.: 592,376

[52] U.S. Cl. .................................. 423/17; 423/7; 210/54
[51] Int. Cl.² ........................................ C01G 43/02
[58] Field of Search ......... 423/17, 7; 210/51, 54 A, 210/54 R

[56] References Cited

UNITED STATES PATENTS

| | | |
|---|---|---|
| 3,210,151 | 10/1965 | Koble .................................. 423/17 |
| 3,239,307 | 3/1966 | Reusser ............................... 423/17 |
| 3,480,761 | 11/1969 | Kolodny et al. .................. 210/54 A |
| 3,657,378 | 4/1972 | Volk et al. ....................... 260/54 A |
| 3,932,276 | 1/1976 | Ford et al. ........................... 423/17 |

FOREIGN PATENTS OR APPLICATIONS 725,460  3/1955  United Kingdom ................. 210/54

Primary Examiner—Edward A. Miller
Attorney, Agent, or Firm—Kinzer, Plyer, Dorn & McEachran

[57] ABSTRACT

Uranium yields, derived from alkaline leaching of a uranium ore, are increased and at the same time the need for fresh water to dissolve a flocculant is eliminated by using sodium polyacrylate as the flocculant, diluted with and dissolved by system water.

4 Claims, 1 Drawing Figure

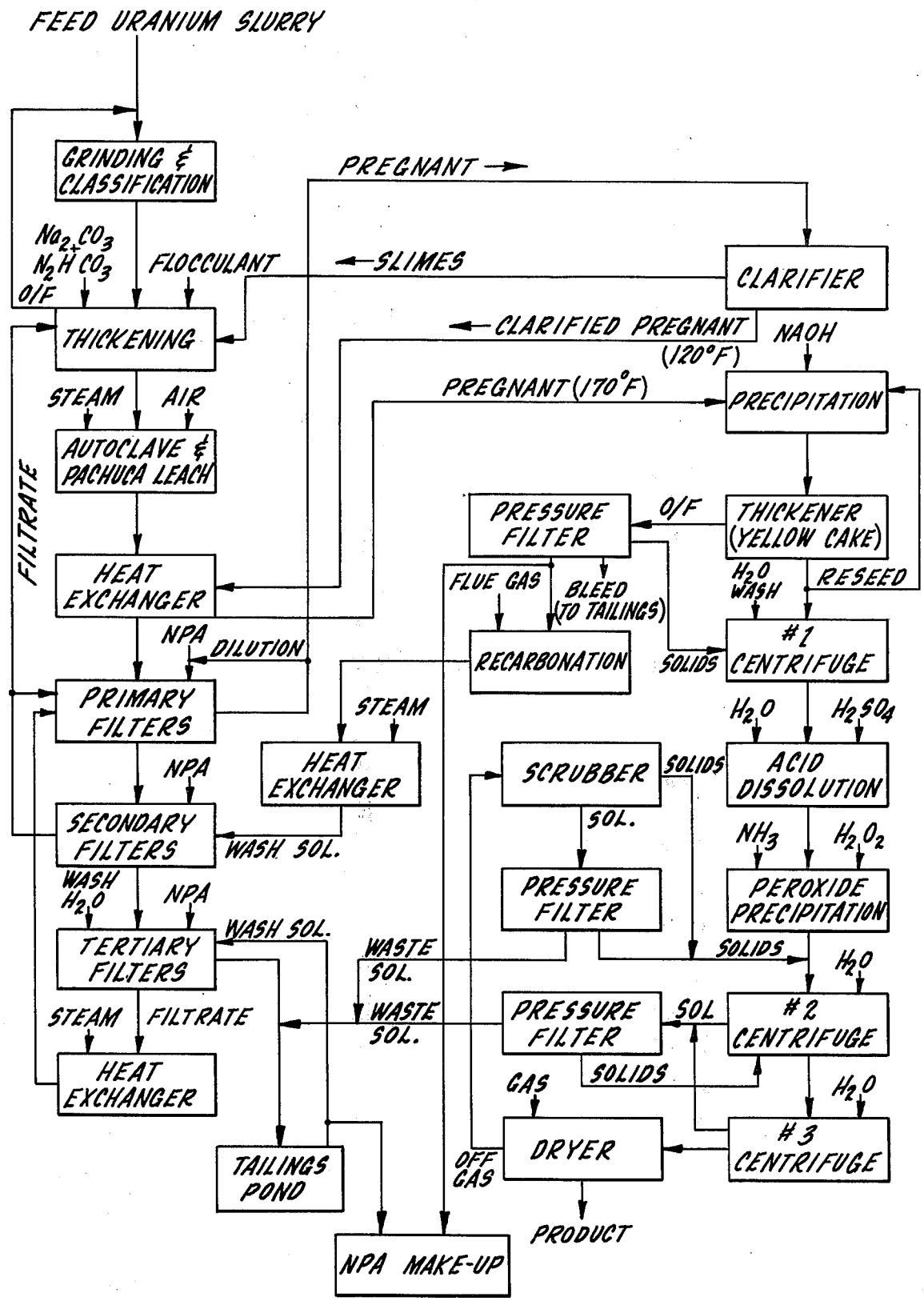

CARBONATE LEACH URANIUM ORE PROCESSING WITH SODIUM POLYACRYLATE FLOCCULANT

This invention relates to a system for processing uranium ores.

In a known process, described for example in *Mining Engineering* (August, 1974) crushed uranium ore in a water slurry is leached with an alkaline solution of sodium carbonate ($Na_2CO_3$) and sodium bicarbonate ($NaHCO_3$) which will be referred to herein as the carbonate or alkaline solution.

The alkaline solution renders the uranium values soluble as uranyl tricarbonate. The remaining solids are filtered; afterwards the filtrant is clarified and then treated with NaOH to produce an initial precipitate of uranium as $U_3O_8$. The supernatant or overflow obtained from initial precipitation is designated "barren" but may contain up to 0.18 to 0.35 mg/L of $U_3O_8$ in the heads of 0.03 to 0.08 mg/L in the tailings, depending on precipitation efficiency.

In an effort to increase recovery, guar gum is employed at the filters to flocculate fine particles ordinarily entrained in the filtrant. Thus, by removing the fines, originated during crushing of the ore, the concentration of soluble uranium values is increased.

Guar gum as a commodity is expensive but of more importance is the fact that guar gum is not appreciably soluble in alkaline water and must be dissolved in fresh water before being employed. Fresh water is at a premium in most localities where uranium ore is available on a commercial scale. In terms of scarcity, the amount of fresh water employed to dissolve the guar gum can be considerable.

System control for uranium leach is based on concentration of carbonate and caustic during the recarbonation and precipitation stages identified in the drawing. Recarbonation discharge is held at 35–40 gm/L of $CO_3$; precipitation at 30 g/L $CSO_3$, 1.2 g/L NaOH. The introduction of fresh water alters the control and it is therefore required that some system water be bled to maintain volumetric solution balances in the instance of using guar gum as a flocculant. Even if the system water so bled is barren water delivered to the tailings pond, a loss of yield is encountered since, as noted, the barren water may contain uranium values. Thus, both uranium values and carbonate values are lost as a result of the bleed.

The objects of the present invention in terms of alkaline leaching of a uranium ore are to dispense with guar gum, to avoid the need for fresh water to dissolve a flocculant and to employ system water to dissolve the flocculant so that solution balances in the system need not be disturbed. In accordance with the present invention, the prevailing need to employ fresh water to dissolve guar gum is entirely eliminated, and yield is increased at the same time, by using high molecular weight sodium polyacrylate in place of guar gum. The sodium polyacrylate is soluble in and easily disperses in an alkaline solution which characterizes the environment.

BRIEF DESCRIPTION OF THE DRAWING

The drawing is a flow diagram or chart of the process of the invention.

Referring to the flow chart there are two essential legs or circuits in the known alkaline process employed to recover $U_3O_8$: the filter leg at the left side of the flow chart and the precipitating leg at the right side.

At the filter side, the uranium ore is ground to a desired mesh size and slurried with liquor and wet slimes returned from the clarifier at the precipitating leg together with one of the recirculated filtrates at the filter side. The solids content in the initial slurry is 35–40% and after thickening is 50–55%.

Uranium extraction may be commenced at an autoclave, where the uranium is oxidized to the hexavalent state, and then leached by the alkaline solution into a water soluble complex uranyl tricarbonate ion. By the time of discharge from the leaching tanks (Pachuca tanks), the leach slurry has extracted virtually all the uranium from the ore. However, the leach may occur first, followed by autoclaving. What remains to be done is to (1) filter the residue as waste and (2) clarify the filtrate in preparation for uranium precipitation.

The leach slurry containing the dissolved uranium conversion product is delivered to a heat exchanger and from thence to a series of three filters (terminated by another heat exchanger) where the waste solids are sequentially removed and discharged to the tailings pond.

Thus, the filtration leg is characterized by countercurrent filtration of leached slurry, with the filter cake from each filter being washed and repulped between stages with a recarbonated barren solution (returned from the precipitation leg) and recycled solution returned from the tailings pond which minimizes loss of uranium in the tailings pond. The filter cake at the primary filter is washed and repulped with hot filtrate from the tertiary filter.

The filtrate from the primary filter stage is the pregnant solution from which $U_3O_8$ is precipitated after a clarification step in a thickening tank which removes slimes; or the slimes may be filtered. The slimes are returned to the initial slurry tank. The solution resulting from clarification is circulated through the first heat exchanger in the filter leg and returned to the precipitating tank where sodium hydroxide is added.

The uranyl tricarbonate ion is stable below pH 11 bu decomposes above pH 12 (NaOH in the precipitating tank) to precipitate sodium diuranate known as yellowcake. The amount of sodium hydroxide is sufficient to neutralize the sodium bicarbonate content of the pregnant solution.

Overflow (O/F) barren solution from the yellowcake thickener contains $Na_2CO_3$ and some NaOH. This overflow is filtered, the bleed is delivered to the tailings pond, the solids are returned to the precipitation leg as shown, and the filtrate is recarbonated by introducing $CO_2$ (flue gas). The $CO_2$ neutralizes the NaOH and converts some of the carbonate to bicarbonate. The barren solution, rejuvenated with carbonate, is used as a wash solution at the secondary filter.

The yellowcake is centrifuged and then dissolved in sulfuric acid incidental to removing unwanted oxides and excess caronate ($CO_3$). Following this removal ammonia is added to decrease the sodium content; hydrogen peroxide is added to precipitate $U_3O_8$, which is separated by centrifuging.

While it is not new to employ a flocculant at the initial slurry tank and the filter stages to increase filter efficiency, thereby enriching the filtrate with uranium values, the uniform practice to the best of our knowledge is to employ a material such as guar gum which requires a source of fresh water to dissolve it, with the disadvantages mentioned above. In any event, we know of no practice in this field where the flocculant is soluble in the barren solution, the recarbonated solution and the pond water. Under the present invention the flocculant is sodium polyacrylate which is soluble in the carbonate solution delivered to the primary filter, soluble in the recarbonated barren solution delivered to the secondary filter and soluble in the pond water employed as a wash at the tertiary filter. It is therefore not necessary to supply fresh water at these three sites where guar gum has been used.

The nominal molecular weight of sodium polyacrylate employed under the present invention is preferably 11 to 15 million, but the useable range is deemed to be 1 to 24 million. Preferably the sodium polyacrylate (designated NPA in the drawing) is in latex form (water dispersed form) as disclosed in U.S. Pat. No. 3624019, highly diluted to a 0.15% solution as hereinafter explained and fed to the three filter sites designated in the drawing at a rate commensurate with the tonnage of uranium ore being processed; about 2/3 is consummed at the primary filter.

Soda ash in substantial quantities is needed to maintain the $CO_3$ level. This level drops as a direct result of the required bleed to accommodate addition of fresh water when using guar gum, but by using sodium polyacrylate the carbonate levels in both the barren solution and pond solution are conserved, and the $U_3O_8$ content in the pond water is exploited to the extend of an estimated 20 pounds per day of $U_3O_8$. In other words, when the system is bled, as heretofore required with guar gum, to provide "room" for "make up " fresh water, the $CO_3$ and $U_3O_8$ equivalents are lost. Thus, if the wash solution for the teritiary filter, derived from the tailings pond is bled to accommodate fresh water "make up" for guar gum addition at the tertiary filter, or if the barren solution is so bled, that represents a quantity of both uranium and carbonate not being exploited.

The filters are vacuum, rotary drum filters fed by a launder, that is, the slurry to be filtered in each instance first passes through a launder which feeds the filter. The sodium polyarylate solution is preferably fed to the conduit which feeds the slurry to the launder, and is not fed to the filter drum since agitation inside the filter is insufficient to thoroughly mix the polymer. Compared to guar gum, it is found the present invention provides a drier cake by 1.2% by weight at each filter, meaning that much more recovery of $U_3O_8$.

Tails pond water and recarbonation feed solution, derived from the filtered overflow at the yellowcake thickner stage, are piped to a make-up tank as shown in the drawing and used for dilution of the sodium polyacrylate latex. No fresh water need be used for dilution and these two sources of system water for dilution of the sodium polycrylate may be employed separately or in unison.

In addition to the importance of saving scarce fresh water, two other considerations are important: First, the bleed solution, although termed "barren", contains $U_3O_8$ values as already noted and in an evaporation pond the uranium oxide is concentrated to a point where it becomes an environmental problem from the standpoint of potential ground water contamination. Also, the $U_3O_8$ has radon daughters associated with it which are lethal at certain levels. Second, $U_3O_8$ lost to tails has been considered uneconomical to recover up to the present time. The NPA make-up water derived from the tailings pond provides a convenient and inexpensive method to recover the $U_3O_8$ values especially since the $U_3O_8$ is worth up to $24 dollars per pound in the present market.

From the make-up tank where the latex is diluted, the polymer is fed to the filter units as shown in the drawing. At the primary filter, where the major flocculating effect is achieved, the diluted latex may be further diluted, for final balancing if necessary, by employing a tap of the pregnant solution, but in nearly all instances there is no need for further dilution at the secondary and tertiary filters.

The active amount of sodium polyacrylate will vary depending on the quality of the ore. In the 19 day plant scale run, the polymer in latex form (approxiamtely 27.4 percent active polymer by weight) diluted with system water to 0.15 percent by weight (that is 0.15 pounds of latex to 99.85 pounds of system water) was fed at the rate of 39 GPM to the three filter sites shown in the drawing. One pound of the undiluted latex (27.4% active) was determined as equivalent to 1.7 pounds of guar gum in the ability to flocculate. Decimal point precision is not involved for polymer addition. Indeed, volumes may be substituted for weight basis during dilution of the latex. The polymer may also be employed as a flocculant at the first thickening stage.

It will be seen from the foregoing that under the present invention the efficiency of leaching uranium ore in a carbonate solution to recover uranium values is improved by employing sodium polyacrylate flocculant which may be dissolved in several sources of carbonate system water; fresh water need not be employed and the system need not be bled to compensate for addition of fresh water to dissolve a flocculant.

We claim:

1. In a process system where uranium values in a water slurry of crushed uranium ore are treated by a solution of carbonate in system water to convert the uranium to a soluble uranyl tricarbonate ion, the slurry then being filtered to remove waste solids delivered to a tailings pond containing system water, and the filtrate being separately treated to precipitate uranium oxide: the improvement characterized by adding to the slurry, fed to the filter, sodium polyacrylate molecular weight 1-24 million dissolved in water obtained from the system.

2. The process of claim 1 in which there are several stages of filters, at least one filtering step being preceeded by said sodium polyacrylate addition.

3. The process of claim 1 wherein the system water containing sodium polyacrylate is either pond water or overflow water from precipitation of uranium oxide recirculated to the filter .

4. The process of claim 1 wherein the system water containing sodium polyacrylate is both pond water and overflow water from precipitation of uranium oxide recirculated to the filter.

* * * * *